United States Patent [19]
Schwarzler et al.

[11] 3,842,748
[45] Oct. 22, 1974

[54] ELECTROMAGNETIC SUSPENSION AND GUIDE SYSTEM PARTICULARLY FOR VEHICLES

[75] Inventors: Peter Schwarzler, Furstenfeldbruck; Gerhard Bohn; Helmut Schauberger, both of Munich, all of Germany

[73] Assignee: Krauss-Maffei AG, Munchen, Germany

[22] Filed: Aug. 11, 1972

[21] Appl. No.: 280,074

[30] Foreign Application Priority Data
Sept. 15, 1971 Germany.............................. 2146142

[52] U.S. Cl............. 104/148 MS, 335/219, 335/297
[51] Int. Cl............................................ B61b 13/08
[58] Field of Search... 104/148 WS, 148 SS, 148 LM; 308/10; 335/219, 281, 297, 299; 336/234

[56] References Cited
UNITED STATES PATENTS

| | | | |
|---|---|---|---|
| 2,374,449 | 4/1945 | Mulcahy | 336/234 |
| 2,391,678 | 12/1945 | Bundy | 336/234 |
| 2,479,302 | 8/1949 | Bondley | 336/234 |
| 2,584,564 | 2/1952 | Ellis | 336/234 |
| 3,107,310 | 10/1963 | Carriere et al | 308/10 |
| 3,378,801 | 4/1968 | Smith | 335/299 |
| 3,585,423 | 6/1971 | Bolton | 104/148 LM |
| 3,662,302 | 5/1972 | Ioffe et al. | 335/219 |
| 3,724,388 | 4/1973 | Karch | 104/148 MS |

FOREIGN PATENTS OR APPLICATIONS

| | | | |
|---|---|---|---|
| 261,085 | 10/1911 | Germany | 104/148 MS |
| 707,032 | 5/1941 | Germany | 104/148 MS |

*Primary Examiner*—Trygve M. Blix
*Assistant Examiner*—Galen Barefoot
*Attorney, Agent, or Firm*—Karl F. Ross; Herbert Dubno

[57] ABSTRACT

An electromagnetic suspension and/or guide system, especially for magnetically suspended vehicles, comprises a U-section electromagnet yoke carrying a coil wound from a light-metal band, the shanks of the U reaching toward a U-section rail or armature on a support track. The cross-section of the core shanks diminishes from the web enveloped by the coil toward the pole surface substantially in proportion to the flux through the shank, while the pole surface projects longitudinally at each end beyond the web over substantially the full height of the coil. The core is preferably of a laminated construction.

12 Claims, 11 Drawing Figures

ELECTROMAGNETIC SUSPENSION AND GUIDE SYSTEM PARTICULARLY FOR VEHICLES

1. Field of the Invention

The present invention relates to magnetic suspension and guide systems and, more particularly, to magnetically suspended vehicles displaceable along a track and having electromagnetic devices for supporting and/or guiding the vehicle.

2. Background of the Invention

In recent years, efforts have been made to increase the efficiency of mass transportation and the speed of transport systems by eliminating or reducing frictional interengagement of a vehicle and a guide track along which the vehicle is displaced. For example, air-cushion vehicles provide a layer of air between the vehicle and the support track to suspend the vehicle on the track which may be located at grade level, above grade or below grade. These systems have, however, the disadvantage that they require high-volume displacement of air, the forcing of air into relatively small gaps, and efficient induction of air into a duct system. All of these requirements mean, of necessity, the generation of considerable noise.

Mention may also be made of the methods of displacing suspended vehicles, including linear-induction motors which provide a substantially contactless interplay of forces propelling the vehicle forwardly without frictional engagement of a driving member with the track, without cogs, chains or cables and without the use of propellers, fans or reaction engines. Other systems for propelling such vehicles make use of the application of a fluid-pressure differential thereacross.

It has been found that, regardless of the motive power or type, advantages can be gained by suspending the vehicle magnetically, i.e., by providing a magnetic attractive force between electromagnets carried by the vehicle and armature rails extending longitudinally along the track. Such electromagnets may be provided with coils and connected to control circuits responsive to variation in the gap between the electromagnet poles and the armature rail for maintaining this gap at an optimum level in spite of variations in loading. Such control means may increase the energization current through the coil with increasing load so that the electromagnetic suspension force balances the load of the vehicle. Electromagnetic devices, using electromagnets on the vehicle and armature rails along the track, have also been provided for guiding the vehicle along its path, i.e., limiting lateral or longitudinal dislocation of the vehicle relative to the track.

In all of these guide and suspension systems, problems have been encountered heretofore because of the magnetic saturation of only certain proportions of the electromagnetic yoke or core while other portions remain magnetically unsaturated for a given coil energization. The premature magnetic saturation of only portions of the core and the constant condition of magnetic nonsaturation of other portions reduces the flux density at the pole surfaces and consequently the ratio of supported load to the weight of the electromagnet. In other words nonuniform magnetic saturation of the core involves more massive electromagnets and, therefore, reduced load-carrying capacity.

OBJECTS OF THE INVENTION

It is a principal object of the present invention to provide a magnetic suspension and guide system in which the specific load-carrying capacity (load-carrying capacity of the vehicle per unit weight of the electromagnets) can be increased over that of conventional systems.

Another object of the invention is to provide improved electromagnetic devices, especially for magnetic suspension and guide systems, in which the magnetic force generated by the electromagnet is increased per unit weight thereof.

Another object of the invention is the provision of an electromagnet for the purposes described in which the magnetic flux per unit electromagnet weight is relatively high, the electromagnet fabrication costs are low, and the magnetic efficiency, in terms of the suspending force of the magnet, is relatively high.

Still another object of the invention is to provide an electromagnetic device for a suspension and guide system of a magnetic suspension vehicle which avoids some of the disadvantages of earlier suspension systems.

It is also an object of the invention to provide an improved magnetically suspended and/or guided vehicle.

SUMMARY OF THE INVENTION

These objects and others which will become apparent hereinafter are attained, in accordance with the present invention, by providing an electromagnet for suspension and guide purposes which comprises a U-profile or U-section core having a pair of shanks extending codirectionally from a web carrying the electromagnetic coil. According to the invention, the cross-section of the shanks is reduced from the web toward the pole surfaces of the core in accordance with the flux traversing the shanks so that the flux density remains substantially constant over the successive cross-sections of the shank between the web and the pole surface. In this manner the magnetic induction within the core is held substantially constant between the coil and the pole surface despite stray-flux loss. Moreover, the coil is composed of a light metal or a light-metal alloy, according to another essential feature of the invention, preferably in the form of a band having a width approximately equal to the width of the web and wound thereabout from end to end.

The term "light metal" or "light-metal alloy" is used herein to refer to aluminum, magnesium and aluminum and magnesium alloy, i.e., alloys containing at least 50 percent by weight aluminum and/or magnesium. Since high conductivity is desirable, the aluminum may be alloyed with conductivity-promoting metals or simply with metals increasing the structural strength of the aluminum or aluminum-alloy foil from which the coil is preferably formed.

The reduction in the thickness of the shanks of the core can correspond to the stray-flux loss along the shanks so that the entire cross-section of the magnetic core is always traversed by the maximum magnetic-induction field. In this manner, it has been found to be possible to prevent saturation of only a portion of the core while other portions remain magnetically unsaturated.

The reduction of the weight of the magnet by reducing the cross-section of the core in accordance with the magnetic losses in the form of stray magnetic flux, is only possible if the small pole faces which result from reduction in the cross-section of the shanks, sustain a higher flux density than would be the case for the shank of full cross-section. Surprisingly this can be achieved by using the electromagnet coil of a light metal or light-metal alloy in spite of the fact that such metals have higher specific resistivities than metals such as copper which has been used heretofore as the conductors in coils of magnetic suspension systems. It appears that the weight of the magnetic coil, when applied to an electromagnet of the elongated U-profile core type, contributes substantially to a reduction in the useful load of the vehicle by comparison with a system in which the magnet is energized with the same current with an aluminum-foil coil. While such coils may require larger core masses, the weight of the coil and the weight of the core, taken together, is less with the system according to the present invention than with a copper-wound electromagnet having the same suspension and guide capacity.

According to another feature of the invention, the coil is wound upon the web of the yoke or core from aluminum foil at least one surface of which has been oxidized to provide a heat-resistant electrical-insulating layer. The foil-wound coil provides a relatively high heat-transfer surface area and heat-distribution from the coil is further enhanced by the greater access of cooling air to the coil and to the core brought about by the reduction in the thickness of the shanks of the core. It is also found that the oxidation layer of the aluminum foil is so oxidation-resistant that the coil can be operated at high temperatures and thus the overall winding height of the coil can be kept low, thereby enabling a small coil of low weight to be employed.

In general, when the electromagnet of the present invention is employed for the magnetic suspension or guiding of a vehicle, a number of such electromagnets must be provided in succession along the vehicle body in the direction of travel thereof. Between the spaced-apart magnets in a conventional system, however, there are sharp reductions or interruptions of magnetic induction fields at the armature in the gaps between the electromagnets which result in eddy currents in the armature rail and produce a braking force which in itself is undesirable. Furthermore, these eddy currents reduce the suspending effect of the electromagnetic forces generated at the vehicle between electromagnet and rail so that larger magnets are necessary.

It has now been found that these eddy currents and their detrimental effects can be minimized when, in an electromagnet system of the aforedescribed type, the poles of the shanks are extended longitudinally substantially to or beyond the longitudinal limits of the coils and close to the poles of the next electromagnet. The prolonged pole portions, preferably of outwardly diminishing cross-section to maintain a uniform magnetic induction or flow density as already described, appear to completely eliminate or substantially reduce eddy current braking and increase the suspending efficiency of the electromagnet. Furthermore, the prolongations may converge toward the longitudinally contiguous (adjacent) electromagnets at opposite longitudinal ends of the electromagnet in question so that any effect of one electromagnet on the other is reduced.

It has also been found to be advantageous, to minimize the response lag of the electromagnetic core, to constitute the latter from laminations which reduce eddy current influences retarding a response of the system to variations in the current flow through the coil. When, for example, the loading of the vehicle increases (tending to increase the gap) or the vehicle is exposed to a lateral (wind or centrifugal) force tending to increase the gap between a guide electromagnet and its armature rail, the control system automatically responds to increase the magnetic force to restore the original gap width or otherwise balance the magnetic suspension or guiding force against the externally applied or loading force. When the body of the core is solid, the eddy currents generated therein produce a lag in the response at the pole surfaces to a change in the energization current of the electromagnet. This can be limited, if not eliminated, by laminating the core. According to the invention, the core is laminated from U-section magnetically premeable (iron) sheets and has a high mechanical stiffness even when it is over a length greater than a meter.

To accommodate the reduction in magnetic cross-section of the shanks, it is preferred to provide additional lamellae or sheets at the web and to provide a U-section solid mass within the channel formed by the core, the additional sheets terminating some distance away from the pole faces and the solid body or thicker sheet terminating somewhat closer to the pole face. In this case, the reduction in cross-section is somewhat stepped.

It has been found to be particularly convenient to produce a core of this type by winding a coil of the lamellae or sheet material on a cylindrical mandrel, distorting the resulting cylinder to impart a rectangular profile to the latter, and severing (longitudinally subdividing) the resulting rectangular-section tube to produce a pair of rigid channels constituting the core.

DESCRIPTION OF THE DRAWING

The above and other objects, features and advantages of the presnt invention will become more readily apparent from the following description, reference being made to the accompanying drawing in which.

SPECIFIC DESCRIPTION

Figures 8, 9, 10, 11:
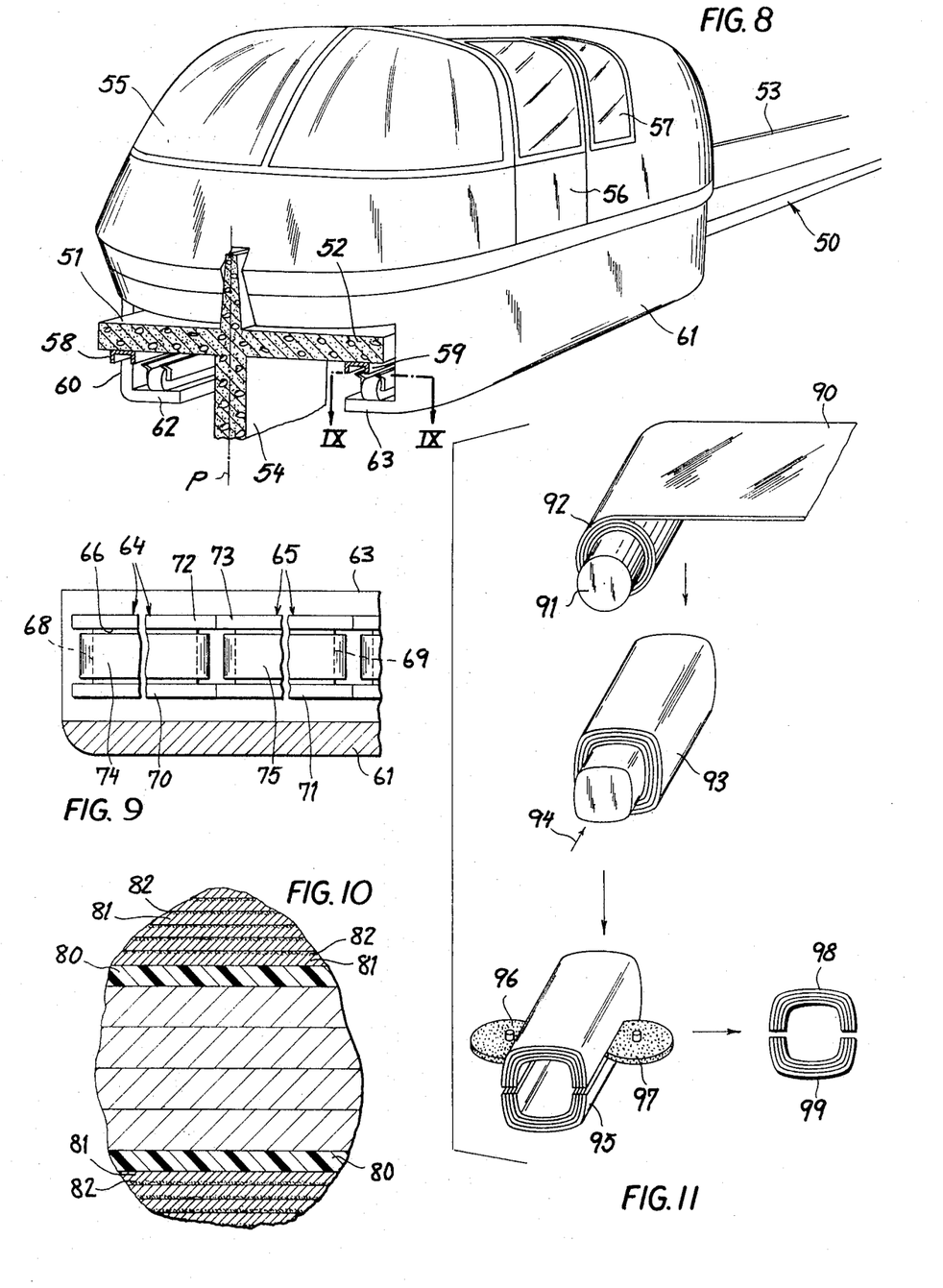
FIG. 8 is a diagrammatic perspective view of a vehicle using the system of FIGS. 1 - 7.
FIG. 9 if a fragmentary cross-section taken along the line IX — IX of FIG. 8.
FIG. 10 is a detail cross-section illustrating the laminated core and aluminum-foil core arrangement according to the invention.
FIG. 11 is a diagram illustrating successive steps in the manufacture of the core according to the present invention.

Referring first to FIG. 8, it can be seen that a magnetic-suspension vehicle system, according to the invention, constituted as an aerial railway, a railway at grade level, or a railway below grade, generally comprises a track 50 having a pair of arms 51 and 52 extending laterally from a stabilizing rib 53 rising through the center of the vehicle. The track is supported at intervals by pylons 54. The vehicle may have an operator compartment 55 and a door 56 opening into a passenger compartment 57. The vehicle may be driven by a linear induction motor and may be provided with shoes engaging electric rails along the track which deliver electric current to the vehicle for both magnetic suspension and guidance and for propelling the vehicle when, for example, a linear induction motor is used.

Along the underside of each of the arms 51 and 52 there is provided a respective downwardly open U-section channel 58, 59 forming armature rails disposed symmetrically on opposite sides of a median plane P through the system. The vehicle body is provided with a pair of downwardly extending aprons 60, 61 whose inwardly extending flanges 62, 63 carry the rows of electromagnets 64 and 65 providing the suspension force. These electromagnets may, as shown in FIG. 9, be longitudinally aligned so that they consist of cores 66, 67 with webs 68, 69 connected to upwardly reaching shanks 70, 71. The shanks 70 and 71 confront the downwardly turned shanks of the armature rail 59 and are extended at 72, 73 to reduce the gap between the electromagnets without causing interference between the magnetic fields thereof. Aluminum foil windings 74 and 75 are provided around the web.

Figure 1:
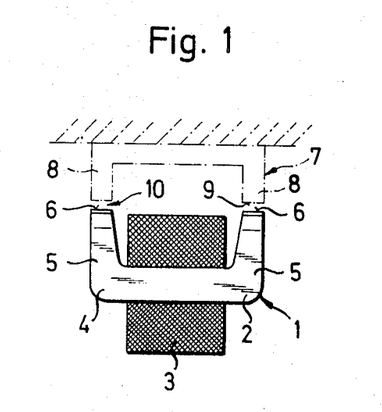
FIG. 1 is an end elevational view, having the electromagnet in section, of a suspension-magnet system embodying the invention.
Figure 2:
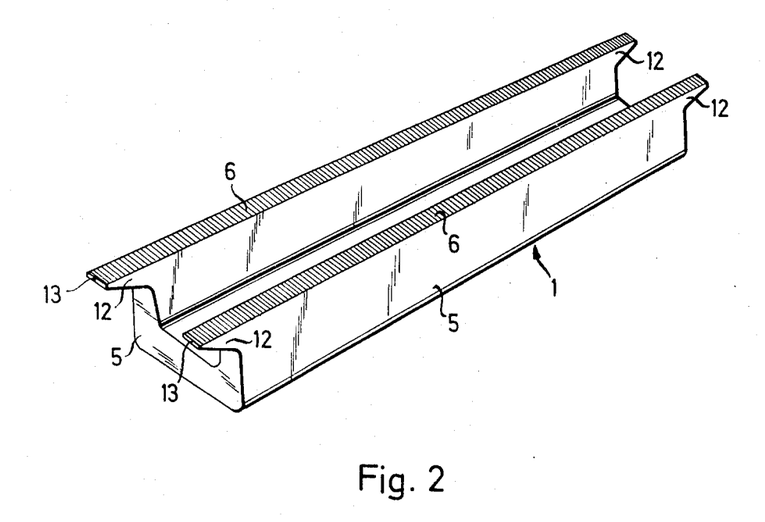
FIG. 2 is a perspective view of the core used in the system of FIG. 1.

In FIGS. 1 and 2, there has been shown an electromagnet 1 for suspending or guiding a magnetic suspension vehicle of the type shown in FIG. 8. It will be understood that the magnetic force generated by the electromagnets at the apron in FIG. 8 raises the vehicle off the support track and balances the load so that the gap is provided between the electromagnets and the respective armatures. An inductive gap detector connected in the electromagnet energization circuit maintains this gap in spite of variations in loading.

The electromagnet 1 comprises a core 2 of a U-shaped profile and a coil 3 of oxidized aluminum foil which is wound without a coil former directly upon a layer 80 of high-temperature electrical insulation upon the web 4 of the coil in the longitudinal direction. The lateral shanks 5 of the magnet 1 have a thickness or width which is reduced progressively from the web 4 to the pole surfaces 6 so that the magnetic induction, in spite of the stray flux between the shanks 5 and the armature rail 7, remains constant within the magnetic core.

The core 1 which is shown in FIG. 1 with its coil 3 and in FIG. 2 without the coil, is fixed to the apron of the vehicle (FIG. 8) and remains at a distance from the shanks 8 of the armature rail 7 when the vehicle is electromagnetically suspended from the support. The core and the armature have confronting pole surfaces 6 and 9, respectively, defining the air gap 10 and extending longitudinally, i.e., in the direction of movement of the vehicle. These two pairs of surfaces lie in respective horizontal planes and the coil is energized via a gap detector to maintain the suspension gap substantially constant. When traverse forces are applied to the vehicle, i.e., forces which tend to drive the electromagnet 1 to the left or to the right, the magnetic force tends to draw the magnet back to a symmetrical position and hence resists such lateral dislocation. Dislocation forces of this type commonly arise from wind, centrifugal force as the vehicle moves around a bend, etc.

As noted in connection with FIG. 9, a number of magnets such as that shown at 1, are arranged in succession in the longitudinal direction without significant loss of magnetic field in the gap between them by extending the lateral shanks 5 forwardly and rearwardly beyond the coil head 11 and in the region of the pole face 6 as shown in FIG. 2 so that substantially no gap is provided between the two adjacent magnets (FIG. 9). The extensions 12 are of reduced (diminishing) cross-section toward the free ends so that only a small end face 13 is provided thereon for abutment or juxtaposition with the corresponding extension faces of the defining magnet.

Figure 3:
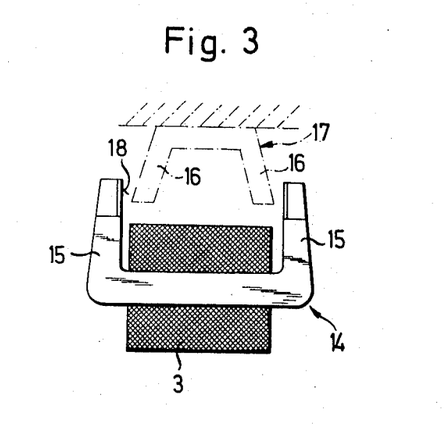
FIG. 3 is a view similar to FIG. 1 of a guide magnet arrangement.
Figure 4:
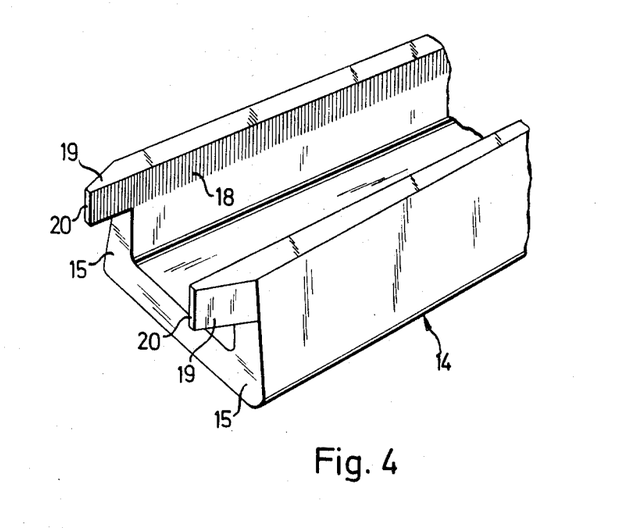
FIG. 4 is a perspective view of the core used in the system of FIG. 3.

FIG. 3 shows another embodiment of the invention using similar principles and which may be employed as suspending or guide arrangement. The electromagnet 14 of this embodiment comprises a coil 3 wound about the web of the U-profile core whose lateral shanks 15 are of diminishing cross-section from the web to the pole surfaces 18. In this embodiment, however, the shanks are extended beyond the top of the coil, i.e., have a height greater than the coil-winding height H, and accommodate the outwardly divergent arms 16 of the armature rail 17 between them. The armature rail, also of U-cross-section, is anchored to the underside of the support as described in connection with FIG. 8. As long as the arms 16 of the armature rail and the shanks 15 are in an overlapping relationship, as shown, the system is considered to have longitudinal stability, i.e., control of the current in coil 3 is basically superfluous. In the transverse direction, however, the system is unstable so that an external stabilization force must be provided to resist lateral dislocation of the magnet 14. The cross-hatched surface 18 of the lateral shank represents the pole face which is extended in the longitudinal direction as shown at 19 to terminate in a narrow end face 20 substantially abutting the adjacent electromagnet. The cross-section of the pole portion diminishes toward the free end as in the system of FIG. 2. It should be noted that the longitudinally stable, laterally unstable system of FIG. 3 can be used with an electromagnet arrangement in which a rail is affixed to a lateral surface of the support and the U-profile electromagnet can be turned on its side to provide lateral stability if desired.

Figure 5:
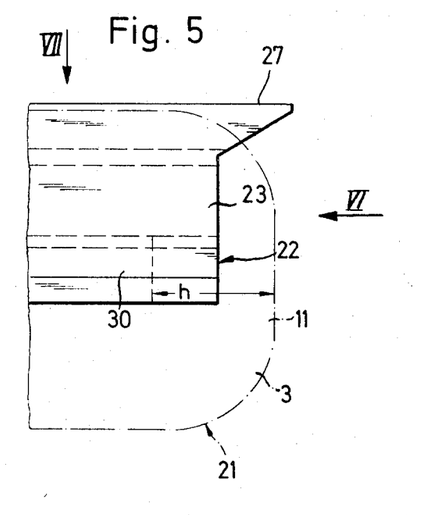
FIG. 5 is a side-elevational view of an electromagnet according to another embodiment of the invention, the coil being represented in dot-dash lines.
Figure 6:
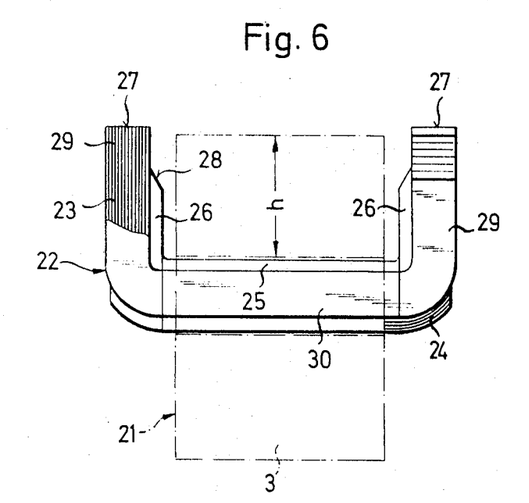
FIG. 6 is an end-elevational view, partly broken away, of the magnet system of FIG. 5.
Figure 7:
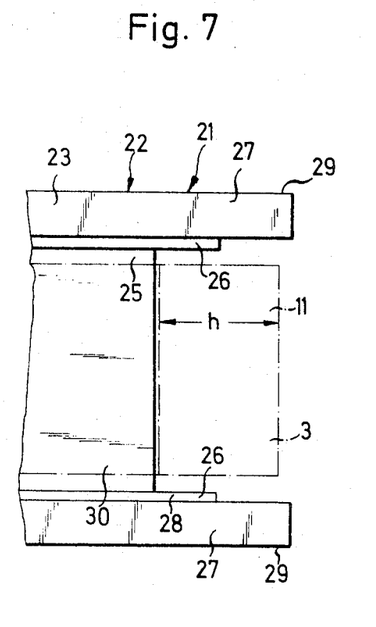
FIG. 7 is a plan view of the magnetic arrangement of FIGS. 5 and 6.

FIGS. 5 – 7 disclose a system which is basically similar to that of FIGS. 1 and 2 but is of increased efficiency. In this system, the suspending or guide electromagnets 21 are formed from a laminated core 22, i.e., a core consisting of iron sheets in U-configuration and nested. The core comprises a central skeleton 23 of uniform wall thickness and thus constant shank thickness consisting of iron sheets having a thickness of 0.5 mm. The cross-section of the yoke is increased at the web and at the transition to the upwardly extending portion by an additional stack of iron sheets with a thickness of 0.5 mm as represented at 24. The magnetic cross-section is also increased in the region of the web and the lower portions of the arms of the U by a 6 mm thick sheet 25, also of U-profile. The shanks of this latter member are set back below the pole faces 27 while the edges of the stack 24 are set back below the ends of shanks 26 so that the thickness of the shank of the composite core is reduced in two steps.

As shown in FIG. 10, the coil 3 which may be wound upon the web 30 of FIGS. 5 – 7 and the webs of the cores of FIGS. 1 – 4 preferably consist of an aluminum foil 81 (greatly enlarged in FIG. 10) having an oxide layer formed on the surface at 82 and constituting the sole insulation between the turns. The width of the foil is substantially equal to the width of the core.

The lateral shanks 29 of the core in the system of FIGS. 5 – 7 project at 27 by about half the coil height 5, the projections being of diminishing cross-section as previously described. Moreover, the web 30 may be set back by half the coil height from the end of the shank.

As illustrated in FIG. 11, the coil skeleton 23 can be formed by spirally winding a sheet 90 of iron having a thickness of 0.5 mm on a mandrel 91 to produce a hollow cylinder 92. The latter is then stretched into a rectangular configuration by driving a former 93 into the cylinder in the direction of arrow 94 to produce a parallelopiped 95 which can be longitudinally subdivided at 96 and 97 to yield two core skeltons 98 and 99. Of course, the system of FIG. 11 can be used to produce the laminated core of FIGS. 5 – 7 and a laminated core for the electromagnets of FIGS. 1 – 4. When a solid core is desired, it can be used as the skeleton for the system illustrated in FIGS. 5 – 7.

These modifications and other readily ascertained by one of ordinary skill in the art, are considered to be within the scope of the invention except as further limited by the appended claims.

We claim:

1. An electromagnetic suspension or guide system comprising a support, an armature rail fixed to said support and an electromagnet juxtaposed with said rail, said electromagnet including a generally U-section elongated core having a web and a pair of lateral shanks extending from said web toward said rail, said shanks being of diminishing thickness away from said web toward respective pole faces formed on said shanks to maintain the magnetic flux density substantially constant in transverse cross-sections through said shank from said web toward said pole faces, and a coil composed of turns of a light metal or a light-metal alloy wound upon said web, said shanks being formed with extensions longitudinally of said core along said pole faces in opposite directions beyond said coil.

2. The system defined in claim 1 wherein said coil is an oxidized aluminum-foil band wound in successive turns around said web whereby the sole insulation separating said turns electrically is an oxide layer on said band, said foil band being wrapped directly around an insulating layer applied to said web.

3. The system defined in claim 1 wherein said extensions are of diminishing cross-section in the longitudinal direction toward free extremities of the respective extension, said free extremities being formed with narrow end faces.

4. The system defined in claim 1 wherein said core is laminated and comprises a stack of nested U-shaped sheets, at least one of said sheets being set back from said pole faces further than another of said sheets.

5. An electromagnetic suspension or guide system comprising a support, an armature rail fixed to said support and an electromagnet juxtaposed with said rail, said electromagnet including a generally U-section elongated core having a web and a pair of lateral shanks extending from said web toward said rail, said shanks being of diminishing thickness away from said web toward respective pole faces formed on said shanks to maintain the magnetic flux density substantially constant in transverse cross-sections through said shank from said web toward said pole faces, and a coil composed of turns of a light metal or a light-metal alloy wound upon said web, said core being liminated and comprising a stack of nested U-shaped sheets, at least one of said sheets being set back from said pole faces further than another of said sheets, said core comprising a laminated skeleton having a web and arms extending codirectionally from said web within said shanks and of constant cross-section, a stack of sheets lying along said web and terminating at a first location along said arms, and a U-shaped plate extending along said skeleton and having arms terminating between said location and said pole faces.

6. An electromagnetic suspension or guide system comprising a support, an armature rail fixed to said support and an electromagnet juxtaposed with said rail, said electromagnet including a generally U-section elongated core having a web and a pair of lateral shanks extending from said web toward said rail, said shanks being of diminishing thickness away from said web toward respective pole faces formed on said shanks to maintain the magnetic flux density substantially constant in transverse cross-sections through said shank from said web toward said pole faces, and a coil composed of turns of a light metal or a light-metal alloy wound upon said web, said coil being composed of a spirally wound band of oxidized aluminum surrounding said web with successive turns insulated from one another solely by the oxide coating of said band, said foil having a width substantially equal to the width of said web, said shanks being formed with longitudinal extensions prolonging said pole faces and of diminishing cross-section in the longitudinal direction, said extensions terminating beyond said coil in the longitudinal direction, said rail being a U-shaped channel having arms juxtaposed with said pole faces, said support being a vehicle track for a magnetically suspended vehicle, said vehicle being formed with a plurality of said electromagnets in longitudinally aligned and contiguous relationship along said rail.

7. The system defined in claim 6 wherein said core is laminated from a multiplicity of iron sheets, at least one of said sheets terminating at a first distance from the pole faces of said shanks and another of said sheets terminating at a second distance greater than said first distance from said pole faces.

8. An electromagnetic suspension or guide system comprising a support, an armature rail fixed to said support and an electromagnet juxtaposed with said rail, said electromagnet including a substantially U-shaped elongated core arranged such that the U-cross-section through said core is perpendicularly directed in relation to the extension of said rail and is in a plane perpendicular to its longitudinal direction, said core having a web and a pair of lateral shanks extending from said web toward respective pole faces formed on said shanks to maintain the magnetic flux density substantially constant in transverse cross-section through said shank from said web toward said pole faces, and a coil composed of turns of a light-metal or a light-metal alloy wound upon said web, said shanks being formed with extensions longitudinally of said core along said pole faces in opposite directions beyond said coil.

9. The system defined in claim 8 wherein said extensions are of diminishing cross-section in the longitudinal direction toward free extremities of the respective extension, said free extremities being formed with narrow end faces.

10. An electromagnetic suspension or guide system comprising a support, an armature rail fixed to said support and an electromagnet juxtaposed with said rail, said electromagnet including a substantially U-shaped elongated core arranged such that the U-cross-section through said core is perpendicularly directed in relation to the extension of said rail and in a plane perpendicular to its longitudinal direction, said core having a web and a pair of lateral shanks extending from said web toward respective pole faces formed on said shanks to maintain the magnetic flux density substantially constant in transverse cross-section through said shank from said web toward said pole faces, and a coil composed of turns of a light-metal or a light-metal alloy wound upon said web, said core comprising a laminated skeleton having a web and arms extending codirectionally from said web within said shanks and of constant cross-section, a stack of sheets lying along said web and terminating at a first location along said arms, and a U-shaped plate extending along said skeleton and having arms terminating between said location and said pole faces.

11. An electromagnetic suspension or guide system comprising a support, an armature rail fixed to said support and an electromagnet juxtaposed with said rail, said electromagnet including a substantially U-shaped elongated core arranged such that the "U"-cross-section through said core is perpendicularly directed in relation to the extension of said rail and is in a plane perpendicular to its longitudinal direction, said core having a web and a pair of lateral shanks extending from said web toward respective pole faces formed on said shanks to maintain the magnetic flux density substantially constant in transverse cross-section through said shank from said web toward said pole faces, and a coil composed of turns of light metal or a light-metal alloy wound upon said web, said coil being composed of a spirally wound band of oxidized aluminum surrounding said web with successive turns insulated from one another solely by the oxide coating of said band, said band having a width substantially equal to the width of said web, said shanks being formed with longitudinal extensions prolonging said pole faces and of diminishing cross-section in the longitudinal direction, said extensions terminating beyond said coil in the longitudinal direction, said rail being a U-shaped channel having arms juxtaposed with said pole faces, said support being a vehicle track for a magnetically suspended vehicle, said vehicle being formed with a plurality of said electromagnets in longitudinally aligned and contiguous relationship along said rail.

12. The system defined in claim 11 wherein said core is laminated from a multiplicity of iron sheets, at least one of said sheets terminating at a first distance from the pole faces of said shanks and another of said sheets terminating at a second distance greater than said first distance from said pole faces.

* * * * *